United States Patent [19]
Wright

[11] 3,755,282
[45] Aug. 28, 1973

[54] SUSPENSION POLYMERIZATION OF VINYL AROMATIC MONOMERS IN THE PRESENCE OF UNSATURATED CARBOXYLIC ACID

[75] Inventor: Harold Austin Wright, Murrysville, Pa.

[73] Assignee: Sinclair-Koppers Company, Pittsburgh, Pa.

[22] Filed: June 29, 1971

[21] Appl. No.: 157,848

[52] U.S. Cl. 260/93.5 W, 260/78.5 R, 260/88.1 PC, 260/91.5
[51] Int. Cl. .......................... C08f 1/11, C08f 7/04
[58] Field of Search .............. 260/93.5 W, 88.1 PC, 260/91.5

[56] References Cited
UNITED STATES PATENTS

| | | | |
|---|---|---|---|
| 3,647,773 | 3/1972 | Ohe et al. ..................... | 260/93.5 W |
| 2,652,392 | 9/1953 | Hohenstein et al. .......... | 260/93.5 W |
| 2,687,408 | 8/1954 | Grim ............................ | 260/93.5 W |
| 3,068,192 | 12/1962 | White .......................... | 260/93.5 W |
| 3,449,311 | 6/1969 | Lowell ......................... | 260/93.5 W |

*Primary Examiner*—James A. Seidleck
*Attorney*—Lewis J. Young et al.

[57] ABSTRACT

The production of polymer beads by a suspension polymerization process in which a vinyl aromatic monomer having a free-radical generating catalyst dissolved therein is suspended in an aqueous medium with the aid of from 0.2 to 1.0 per cent by weight, based on monomer, of a finely divided phosphate suspending agent and heated to cause the monomer toA polymerize into polymer beads is improved by the addition to the suspension of at least about 0.0001 per cent by weight based on monomer of an $\alpha,\beta$-ethylenically unsaturated carboxylic acid as sole extender. The process of the invention is especially applicable in the preparation of large polymer beads.

4 Claims, 1 Drawing Figure

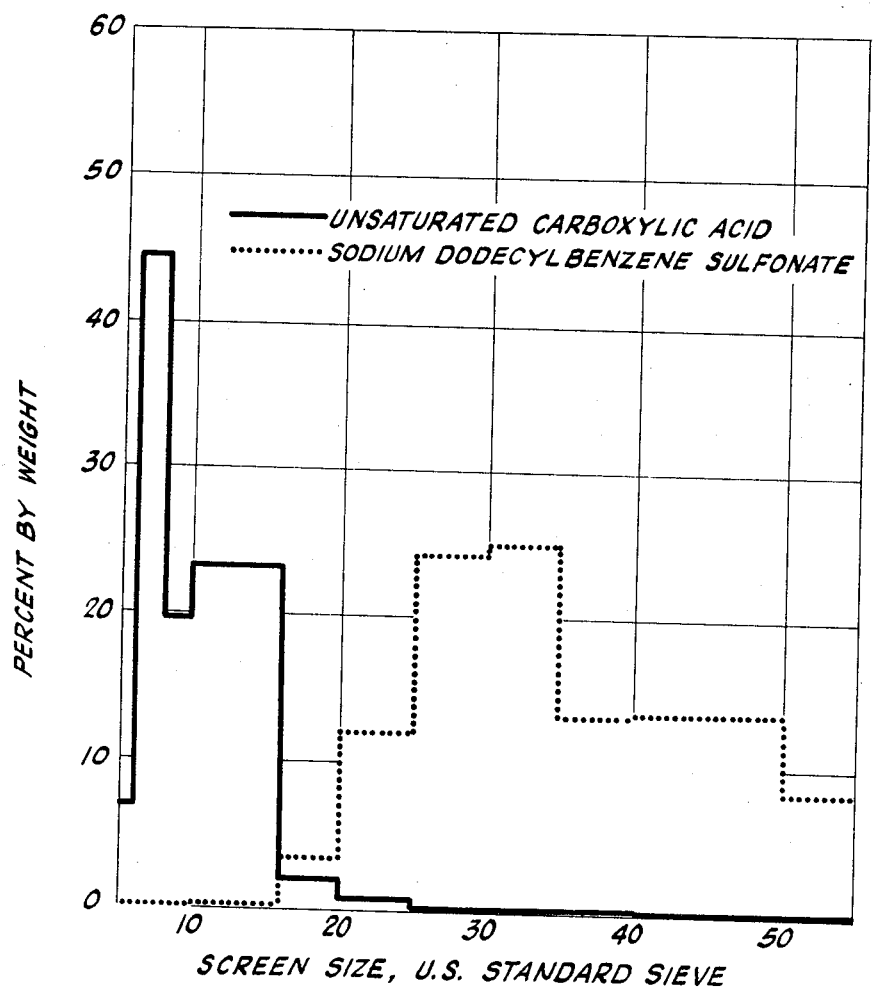

SUSPENSION POLYMERIZATION OF VINYL AROMATIC MONOMERS IN THE PRESENCE OF UNSATURATED CARBOXYLIC ACID

BACKGROUND OF THE INVENTION

Free-radical initiators, particularly peroxidic initiators such as benzoyl peroxide, are commonly used as the primary initiator, or catalyst, in the suspension polymerization of vinyl aromatic monomers such as styrene. These initiators, being predominantly oil soluble and water insoluble, are believed to react within the monomer droplets in suspension to cause the polymerization in the following manner:

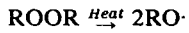

Grim U.S. Pat. 2,673,194, describes the suspension polymerization of vinyl aromatic monomers, whereby an oily monomer is suspended as droplets in an aqueous medium and polymer beads or particles are produced by the use of an oil-soluble polymerization catalyst, such as benzoyl peroxide. The suspending system of Grim patent is comprised of finely divided, difficultly water-soluble phosphates, and an anionic surface-active agent which serves as an extender. As used in this art, compounds which act to increase the ability of the finely divided phosphate dispersant to stabilize suspensions are termed extenders. The extenders increase the ability of the phosphate dispersant to maintain stable suspensions with a greater proportion of monomer and/or polymer in the suspension polymerization medium. Among the extenders listed by Grim are: sodium dodecylbenzene sulfonate, sodium tetradecyl sulfate, potassium stearate, and long chain alkyl sulfonates.

The suspension systems such as that of Grim produce polymer beads having a broad particle size distribution. The individual beads produced in suspension may range in diameter from less than 300 microns to above 2,000 microns with the average bead diameter being dependent upon the amount of suspending agent and extender present in the system. The average bead diameter can be controlled to some extent by varying the parameters of the system such as the ratio of suspending agent to extender or the ratio of suspending agent and extender to monomer. Although the average diameter size is changed through such variations, nevertheless, beads will be produced whose particle size range is broad.

For commercial reasons, it is highly desirable in this art to control the average particle size range within relatively narrow limits. This is especially true where the polymer beads are to be impregnated with a volatile expanding agent to produce polymer beads which will, upon heating, expand, e.g., in a mold, to fill the mold cavity and produce fused, expanded polymer articles.

One of the major uses of expandable polymer beads, particularly polystyrene beads, which are produced commercially by suspension polymerization, is in insulation applications such as insulation board. In manufacturing insulation board, it is common to mold a large (e.g. 4 ft. × 8 ft. × 20 ft.) billet of expanded polystyrene and subsequently cut the billet into slabs one or two inches thick for ultimate use as an insulation board. In preparing the large billets from expandable polymer beads, the beads are first preexpanded to form non-fused, partially expanded beads having a bulk density of from 0.8–1.2 pounds per cubic foot. The partially expanded beads are then charged to the billet mold, and heat, usually in the form of steam, is applied to fully expand the beads whereby they fill the mold, fuse, and form the billet.

In the billet-molding application, it is especially critical that the expandable polymer beads be relatively large and substantially spherical.

If the beads are too small, then the expandable beads at the outer surface of the billet mold will fuse too soon, thereby excluding steam from the center of the mold. The resulting billet, therefore, has a center of unfused, expanded beads which is, of course, highly undesirable since any unfused portion of the billet is useless.

Hohenstein et al, in U. S. Pat. No. 2,652,392, reduced the amount of small particle-size beads formed by adding a water-soluble persulfate as extender for the calcium phosphate stabilizer.

I have shown in my copending application, Ser. No. 868,286, filed Oct. 14, 1969, now U.S. Pat. 3,631,014 that narrow distribution of bead sizes larger than 300 microns in diameter can be produced by the addition of at least 0.0003 per cent by weight based on monomer of sodium bisulfite as sole extender for the phosphate.

I have also shown in my copending application, Ser. No. 48,418, filed June 22, 1970, now U.S. Pat. 3,649,610 that narrow distribution of bead sizes larger than 750 microns in diameter can be produced by the addition of at least 0.01 per cent by weight based on monomer of certain terminal vicinal hydroxy-keto compounds as extender for the phosphate.

SUMMARY OF THE INVENTION

I have now discovered another class of compounds, namely α,β-unsaturated carboxylic acids, which when used as extenders for the difficultly water-soluble phosphate allow the preparation of polymer beads by the suspension polymerization of a vinyl aromatic monomer in an aqueous system containing the phosphate. The phosphate is preferably used in amounts between 0.2 and 1.0 per cent by weight based on monomer. The extenders may be any of the α,β-unsaturated mono-, di-, or tricarboxylic acids and are used in amounts between 0.0001 and 1.0 per cent by weight based on monomer and such that the ratio of the phosphate to the acid is between 10 to 1 and 1,000 to 1. It is possible, by selection of the proper acid extender in the appropriate ratios to the phosphate to obtain by the method of the present invention, polymer beads having a narrow distribution of particle sizes greater than about 1200 microns in diameter, e.g. 1,200–3,400 microns.

DESCRIPTION OF THE DRAWING

The drawing is a bar graph comparing a typical bead size distribution obtained in accordance with the process of the invention and a distribution obtained using a conventional polymerization system of tricalcium phosphate and sodium dodecylbenzene sulfonate.

DETAILED DESCRIPTION

This invention is applicable in the suspension polymerization of vinyl aromatic monomers such as styrene, alpha-methyl styrene, mono- and dichloro styrene, as well as the copolymerization of vinyl aromatic monomers with such monomers as divinylbenzene, alkyl acrylates, diallyl esters of dibasic, aliphatic or aromatic acids, butadiene, and other polymers capable of further polymerization such as styrene-butadiene, styrene-isoprene, and polybutadiene rubbers.

The finely divided, difficultly water-soluble phosphates useful as dispersing agents in the practice of this invention are conventional and are those described, for example, in Grim Pat. No. 2,673,194. They include those finely divided phosphates difficultly soluble in water containing for each phosphate group at least three equivalents of a metal, the carbonate of which is only slightly soluble in water, e.g., tricalcium phosphate, hydroxy-apatite, magnesium phosphate, etc. Advantageously, the amount of phosphate to be employed in this invention ranges from about 0.20 to 1.0 per cent by weight based on monomer. The average particle size of polymer beads produced in the suspension polymerization depends primarily upon the total amount of phosphate suspending agent; for example, suspension with larger amounts of phosphate suspending agent yields beads of a smaller average particle size.

The use of the novel extenders, i.e. $\alpha,\beta$-unsaturated carboxylic acid compounds of this invention as sole extender reduces the proportion of polymer particles produced that have sizes that deviate substantially from the mean particle size of the polymer beads produced. Surprisingly, the extenders of this invention allow the production of large, essentially spherical, beads having few, if any, out-of-round beads. It had been the experience heretofore that when large bead sizes were obtained, the beads produced were not spherical. Surprisingly, also the bead size distribution of the beads is confined within selected narrow limits by providing an extender in accordance with this invention for the difficultly water-soluble phosphate comprising an $\alpha,\beta$-unsaturated mono-, di-, or tricarboxylic acid. The acid compound is added as the sole extender in the system.

Suitable extenders found to be effective in accordance with the invention are the $\alpha,\beta$-unsaturated mono- di-, and tricarboxylic acids. Examples of such acids found suitable are acrylic, methacrylic, crotonic, sorbic, maleic, fumaric, citraconic, mesaconic, itaconic, and aconitic acids.

The acids are effective in amounts between 0.0001 and 1.0 per cent by weight based on monomer. The amount of extender used depends upon the amount of phosphate and the ratio of phosphate to acid should be between 10 to 1 and 1000 to 1. The preferred ratio of phosphate to extender is between 20 to 1 and 500 to 1. Depending on the acid used, the ratio of phosphate to acid may be higher or lower. For example, itaconic and acrylic acids allowed the suspension to fail at ratios below 5 to 1, but aconitic acid maintains suspension at a ratio as low as 1 to 1. Similarly, suspensions have been maintained with itaconic acid at a ratio of 10,000 to 1, whereas both acrylic and methacrylic acids allowed failure of suspension at 10,000 to 1 ratio.

The process of the invention may be used with monomer to water ratios which vary from about 0.3 to 1.5 parts by weight monomer per 1.0 part by weight water. The invention is especially valuable in that generally high monomer to water ratios are used, and a higher proportion of monomer in the suspension system is, of course, preferred from an economic standpoint.

The time and temperature cycles for the polymerization may be those conventionally employed. Conveniently, the cycle described in the Grim patent above, or the two-stage temperature cycle described in D'Alelio U.S. Pat. 2,692,260 is employed.

The free-radical initiating catalysts which are added to the suspension system are the conventional oil-soluble (monomer-soluble) oxidation catalysts such as organic peroxides, e.g., benzoyl peroxide and t-butyl perbenzoate. Other free-radical producing catalysts that may be used in the invention include azobisisobutyronitrile. Conveniently, conventional amounts of such catalysts are used in the invention.

This invention is further illustrated by, but is not intended to be limited to, the following examples wherein parts are parts by weight unless otherwise indicated.

EXAMPLE I

To a 12-ounce, crown-capped bottle was added 100 parts of water, 0.5 part of the dispersing agent, tricalcium phosphate, 0.005 part aconitic acid as extender, 0.30 part of the catalyst comprising 0.25 part of benzoyl peroxide and 0.05 part of t-butyl perbenzoate, and 100 parts of styrene monomer. The suspension was tumbled end-over-end in a heated oil bath at 90°C. for 7 hours. The suspension was then cooled and acidified with hydrochloric acid to a pH of about 1.0 to dissolve the phosphate. The beads were separated by centrifuge, washed with water, and air dried. The beads were screened into portions. The screen analysis, U. S. Standard Sieve, in per cent by weight of polymer beads retained on each size screen, is as follows:

| Screen No. | Weight Percent Polymer Retained |
|---|---|
| 6 | 7.0 |
| 8 | 44.8 |
| 10 | 19.8 |
| 16 | 23.2 |
| 20 | 2.0 |
| 25 | 0.9 |
| 40 | 0.3 |
| Pan | |

It should be noted that the weight per cent polymer recorded in the screen analysis does not add up to 100 per cent. The reason for this is that the weights are based on 100 parts monomer. Thus the total percentage represents the per cent yield of polymer based on monomer and does not represent a percentage of the total polymer beads formed. All screen analyses in these examples are reported in the same manner.

EXAMPLE II

So that a comparison could be made of the product of the invention with the product made by the use of an extender such as described in Grim U.S. Pat. No. 2,673,194, there were added to a reactor equipped with a two-bladed impeller, 42 parts of water containing 0.1316 part of the suspending system consisting of 0.131 part of tricalcium phosphate and 0.0006 part of sodium dodecylbenzene sulfonate (Nacconol NRSF), and 58 parts of styrene monomer having dissolved therein 0.171 part of the catalyst comprising 0.145 part benzoyl peroxide and 0.026 part t-butyl perbenzoate. The suspension was agitated at 68 rpm, and heated to 90°C., which took 60 minutes. The suspension was maintained at 90°C. for 365 minutes after which it was cooled and acidified with HCl to a pH of about 1.0 to dissolve the phosphate. The beads were separated by centrifuge, washed with water and air dried. The beads were screened. The screen analysis, U. S. Standard Sieve, is as follows:

TABLE I

| Run No. | Acid | Weight percent phosphate (on monomer) | Weight percent acid (on monomer) | Phosphate/acid ratio | Screen analysis (No.), wt. percent | | | | | |
|---|---|---|---|---|---|---|---|---|---|---|
| | | | | | 10 | 16 | 20 | 25 | 40 | Pan |
| I-1 | Acrylic | 1.0 | 0.004 | 250:1 | 56.5 | 38.2 | 3.3 | 0.4 | Nil | |
| I-2 | Methacrylic | 0.4 | 0.020 | 20:1 | 72.0 | 21.9 | 3.7 | 0.6 | 0.2 | Nil |
| I-3 | Sorbic | 0.4 | 0.020 | 20:1 | 89.5 | 7.9 | 0.6 | 0.3 | 0.1 | Nil |
| I-4 | Maleic | 0.5 | 0.0005 | 1,000:1 | 7.9 | 31.8 | 29.4 | 10.7 | 16.9 | 6.3 |
| I-5 | Fumaric | 0.3 | 0.0003 | 1,000:1 | 72.2 | 23.4 | 2.0 | 0.3 | Nil | |
| I-6 | Citraconic | 0.5 | 0.0005 | 1,000:1 | 4.0 | 30.7 | 40.1 | 12.0 | 11.8 | 0.2 |
| I-7 | Mesaconic | 0.8 | 0.0008 | 1,000:1 | 48.5 | 44.8 | 3.0 | 0.9 | 0.6 | 0.2 |
| I-8 | Itaconic | 0.2 | 0.0002 | 1,000:1 | 84.8 | 11.4 | 1.5 | 0.4 | 0.1 | Nil |
| I-9 | Aconitic | 0.7 | 0.007 | 100:1 | 10.4 | 61.2 | 14.5 | 6.3 | 5.2 | 0.1 |

| Screen No. | Weight Percent Polymer Retained |
|---|---|
| 10 | 0.1 |
| 16 | 0.2 |
| 20 | 3.4 |
| 25 | 12.1 |
| 30 | 24.1 |
| 35 | 24.9 |
| 40 | 13.2 |
| 50 | 13.3 |
| pan | 8.4 |

The screen analyses obtained in Examples I and II are graphically illustrated in the drawing. The polymerization by the method of the invention in the presence of aconitic acid produces a bead diameter size range which is extremely narrow. The yield of product having diameter greater than 1,200 microns obtained by the method of the invention was almost 95 per cent of monomer charged. The yield of product obtained by using a sodium dodecylbenzene sulfonate extender with the tricalcium phosphate suspension system was, in the desirable particle size, only 0.3 per cent weight of monomer charged and the remaining 99.7 per cent by weight has a broad distribution of sizes ranging from 300 to 1,200 microns.

EXAMPLE III

To illustrate the general applicability of unsaturated carboxylic acids as extenders for tricalcium phosphate in the suspension polymerization of styrene, to each of a series of 12-ounce crown-capped bottles was added 100 parts of water, 0.30 part of the catalyst comprising 0.25 part of benzoyl peroxide and 0.05 part of t-butyl perbenzoate, 100 parts of styrene, and the amounts of tricalcium phosphate as dispersing agent and the amounts of the indicated carboxylic acid shown in Table I. The bottles were then capped and the systems suspension polymerized by the method of Example I. The screen analysis of the resulting polymer beads is shown in Table I.

EXAMPLE IV

In order to illustrate the applicable range of the ratio of phosphate to carboxylic acid extender, a series of polymerizations were run wherein 1 per cent phosphate was added to each of a series of bottles and the amounts of the indicated acid shown in Table II were added to vary the ratio. The remainder of the conditions (monomer, catalyst, temperature and time) were

TABLE II

| Run No. | Acid | Weight percent phosphate (on monomer) | Weight percent acid (on monomer) | Phosphate/acid ratio | Screen analysis (No.), wt. percent | | | | | |
|---|---|---|---|---|---|---|---|---|---|---|
| | | | | | 10 | 16 | 20 | 25 | 40 | Pan |
| II-1 | Itaconic | 1.0 | 0.0001 | 10,000:1 | 0.8 | 3.2 | 18.6 | 20.8 | 47.4 | 6.7 |
| II-2 | do | 1.0 | 0.0005 | 2,000:1 | Nil | 0.4 | 0.6 | 1.2 | 31.3 | 64.6 |
| II-3 | do | 1.0 | 0.001 | 1,000:1 | Nil | 3.2 | 19.4 | 20.9 | 42.8 | 13.4 |
| II-4 | do | 1.0 | 0.005 | 200:1 | 0.9 | 31.3 | 31.6 | 10.0 | 13.4 | 10.9 |
| II-5 | do | 1.0 | 0.010 | 100:1 | 3.6 | 47.3 | 17.2 | 7.4 | 10.8 | 11.9 |
| II-6 | do | 1.0 | 0.050 | 20:1 | 2.0 | 20.9 | 13.4 | 8.0 | 25.5 | 25.0 |
| II-7 | do | 1.0 | 0.10 | 10:1 | 0.7 | 14.5 | 14.2 | 9.8 | 34.2 | 24.7 |
| II-8 | do | 1.0 | 0.20 | 5:1 | Lost suspension | | | | | |
| II-9 | do | 1.0 | 1.0 | 1:1 | Lost suspension | | | | | |
| II-10 | Acrylic | 1.0 | 0.0001 | 10,000:1 | Lost suspension | | | | | |
| II-11 | do | 1.0 | 0.001 | 1,000:1 | Lost suspension | | | | | |
| II-12 | do | 1.0 | 0.010 | 100:1 | 3.9 | 47.6 | 28.5 | 9.3 | 9.1 | 0.4 |
| II-13 | do | 1.0 | 0.050 | 20:1 | 0.6 | 8.5 | 23.0 | 16.1 | 40.9 | 10.3 |
| II-14 | do | 1.0 | 0.10 | 10:1 | 0.5 | 4.1 | 15.1 | 13.1 | 39.7 | 24.8 |
| II-15 | do | 1.0 | 1.0 | 1:1 | Lost suspension | | | | | |
| II-16 | Aconitic | 1.0 | 0.001 | 1,000:1 | Nil | 0.5 | 1.8 | 3.1 | 50.9 | 41.6 |
| II-17 | do | 1.0 | 0.010 | 100:1 | 0.4 | 32.5 | 35.8 | 10.5 | 16.0 | 3.0 |
| II-18 | do | 1.0 | 0.050 | 20:1 | Nil | 2.1 | 15.4 | 16.7 | 44.1 | 20.0 |
| II-19 | do | 1.0 | 0.10 | 10:1 | 13.3 | 30.2 | 3.2 | 3.8 | 25.3 | 22.3 |
| II-20 | do | 1.0 | 1.0 | 1:1 | Nil | 18.2 | 28.5 | 12.9 | 30.4 | 8.7 | the same as in Example I. The screen analyses of the beads produced are shown in Table II (as weight per cent based on monomer charged) and reported as per cent retained on U. S. Standard Sieves as numbered. As can be seen from the table, the allowable ratio may vary for the various acid extenders, but generally ratios between 1000 to 1 and 10 to 1 are preferred. As expected, at the 1.0% phosphate level, the beads produced are generally smaller than would be produced at lower phosphate concentrations.

EXAMPLE V

To illustrate the known effect of phosphate concentration on the average bead diameter size the following series of polymerizations were carried out using the method and conditions of Example I while varying the acid extender, the phosphate concentration and the ratio of phosphate to acid. The results are shown in Table III.

TABLE III

| Run No. | Acid | Weight percent phosphate (on monomer) | Weight percent acid (on monomer) | Phosphate/acid ratio | Screen analysis (No.), wt. percent | | | | | |
|---|---|---|---|---|---|---|---|---|---|---|
| | | | | | 10 | 16 | 20 | 25 | 40 | Pan |
| III-1 | Itaconic | 1.0 | 0.001 | 1,000:1 | Nil | 3.2 | 19.4 | 20.9 | 42.8 | 13.4 |
| III-2 | do | 0.8 | 0.0008 | 1,000:1 | Nil | 1.0 | 4.7 | 10.5 | 54.9 | 26.9 |
| III-3 | do | 0.6 | 0.0006 | 1,000:1 | Nil | 3.5 | 18.3 | 18.1 | 47.2 | 11.2 |
| III-4 | do | 0.4 | 0.0004 | 1,000:1 | 3.3 | 50.3 | 27.2 | 7.8 | 9.1 | 0.6 |
| III-5 | do | 0.3 | 0.0003 | 1,000:1 | 56.3 | 34.0 | 5.7 | 1.8 | 0.5 | Nil |
| III-6 | do | 0.2 | 0.0002 | 1,000:1 | 84.8 | 11.4 | 1.5 | 0.4 | 0.1 | Nil |
| III-7 | do | 1.0 | 0.010 | 100:1 | 3.6 | 47.3 | 17.2 | 7.4 | 10.8 | 11.9 |
| III-8 | do | 0.7 | 0.007 | 100:1 | 1.5 | 44.2 | 30.9 | 8.1 | 9.2 | 4.0 |
| III-9 | do | 0.6 | 0.006 | 100:1 | 6.5 | 67.1 | 15.9 | 3.9 | 3.3 | 2.1 |
| III-10 | do | 0.5 | 0.005 | 100:1 | 11.5 | 67.8 | 13.1 | 2.6 | 1.8 | 0.4 |
| III-11 | do | 0.4 | 0.004 | 100:1 | 42.0 | 46.0 | 6.5 | 1.3 | 1.2 | 1.0 |
| III-12 | Acrylic | 1.0 | 0.010 | 100:1 | 3.9 | 47.6 | 28.5 | 9.3 | 9.1 | 0.4 |
| III-13 | do | 0.8 | 0.008 | 100:1 | 36.5 | 50.0 | 8.2 | 2.1 | 1.7 | 0.3 |
| III-14 | do | 0.6 | 0.006 | 100:1 | 74.4 | 22.1 | 1.5 | 0.2 | Nil | |
| III-15 | do | 1.0 | 0.050 | 20:1 | 0.6 | 8.5 | 23.0 | 16.1 | 40.9 | 10.3 |
| III-16 | do | 0.7 | 0.035 | 20:1 | 2.7 | 40.7 | 26.4 | 10.8 | 17.3 | 0.7 |
| III-17 | do | 0.4 | 0.020 | 20:1 | 61.7 | 29.8 | 4.4 | 1.1 | 0.7 | 1.8 |
| III-18 | Sorbic | 1.0 | 0.050 | 20:1 | 5.7 | 38.6 | 32.7 | 6.4 | 5.8 | 8.3 |
| III-19 | do | 0.7 | 0.035 | 20:1 | 10.2 | 62.3 | 16.7 | 3.6 | 4.4 | 4.2 |
| III-20 | do | 0.4 | 0.020 | 20:1 | 89.5 | 7.9 | 0.6 | 0.3 | 0.1 | Nil |

It can be seen that the average bead size increases as the concentration of phosphate decreases. The data also emphasizes the fact that various average bead sizes and varying distributions of bead diameter sizes can be obtained by the proper selection of phosphate concentration, extender, and phosphate to acid ratio. The optimum concentration and ratio of phosphate suspending agent to acid extender to yield a particular range of bead sizes varies with the extender employed and may be determined by experimentation similar to that represented in Table III.

What is claimed is:

1. In a process for producing polymer beads by polymerizing a vinyl aromatic monomer selected from the group consisting of styrene, alpha-methylstyrene, monochlorostyrene and dichlorostyrene, with an oil-soluble, free-radical generating catalyst in an aqueous suspension under polymerizing conditions, where the suspension is stabilized by the presence of from 0.20 to 1.0 per cent by weight based on monomer of a finely divided, difficultly water-soluble phosphate, the improvement for producing a narrow distribution of bead diameter sizes which comprises adding to the suspension as sole extender a compound selected from the group consisting of acrylic acid, methacrylic acid, crotonic acid, sorbic acid, maleic acid, fumaric acid, mesaconic acid, citraconic acid, itaconic acid, and aconitic acid, in amounts of between about 0.0001 and 1.0 per cent by weight, based on monomer, and such that the ratio of said phosphate to said compound is between 10 to 1 and 1,000 to 1.

2. The process of claim 1 wherein said polymerization produces polymer beads having an average particle size greater than 1,200 microns.

3. The process of claim 1 wherein said monomer is styrene and said catalyst comprises benzoyl peroxide and t-butyl perbenzoate.

4. The process of claim 1 wherein said phosphate is tricalcium phosphate.

* * * * *